E. K. POWERS.
Candy Molder.
No. 82,347.  Patented Sept. 22, 1868.
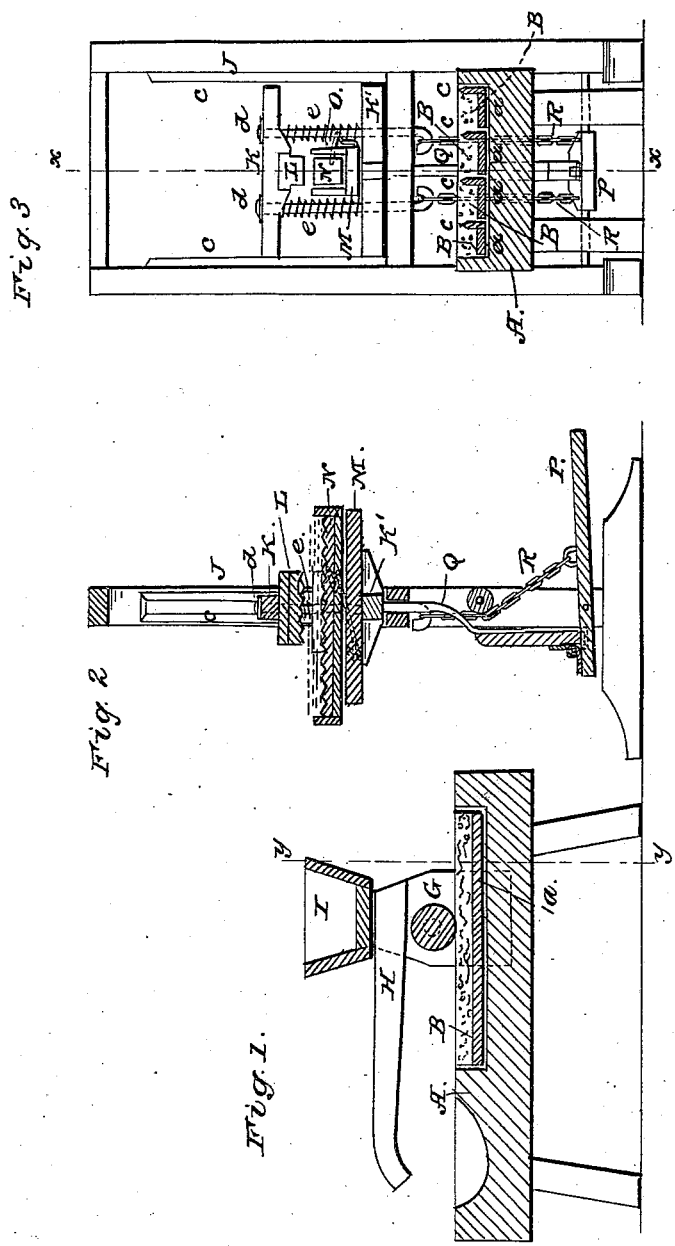

United States Patent Office.

E. K. POWERS, OF GRAND RAPIDS, MICHIGAN.

Letters Patent No. 82,347, dated September 22, 1868.

IMPROVED MACHINE FOR MOULDING CANDY.

*The Schedule referred to in these Letters Patent and making part of the same.*

TO ALL WHOM IT MAY CONCERN:

Be it known that I, E. K. POWERS, of Grand Rapids, in the county of Kent, and State of Michigan, have invented a new and improved Machine for Moulding Candy; and I do hereby declare that the following is a full, clear, and exact description thereof, which will enable those skilled in the art to make and use the same, reference being had to the accompanying drawings, forming part of this specification.

This invention relates to a new and improved machine for moulding candy, and is more especially designed for moulding pop-corn candy.

The invention consists of an improved means for forming the candy into proper-sized sticks, and then compressing the same.

In the accompanying sheet of drawings—

Figure 1 is a side sectional view of a portion of my invention, taken in the line $x\ x$, fig. 3.

Figure 2, a side sectional view of a portion of the same, taken in the line $x\ x$, fig. 3.

Figure 3, an elevation of one portion of the same, the other portion being in section, as indicated by the line $y\ y$, fig. 1.

Similar letters of reference indicate corresponding parts.

The first portion of the device consists of what may be termed the former.

This former consists of a rectangular box or receptacle, A, provided with legs, or any suitable support, and having placed within it a number of moulds, B, composed each of a bottom-piece, $a$, and a vertical strip, $b$, at one side, the strips $b$ being bevelled at each side, at their upper parts, to form a cutting-edge, $c$, as shown clearly in fig. 3.

At one end of the former there is a concave recess, to receive, when not in use, a roller, G, placed in a frame, H, having a box, I, on its upper part, over the roller, said box being designed to receive any substance to operate as a weight, and admit of the roller having the necessary pressure.

The moulds B are placed side by side in the box or receptacle A, and the candy, in a warm and plastic state, is placed in the moulds, and the roller G moved back and forth over them, said roller compressing the candy in the moulds, and the sharp upper edges of the strips $b$ dividing the mass, so that the candy in the moulds will be divided or separated, one from the other.

The moulds B, as well as the roller G, are constructed of wood, and, previous to being used, are well moistened, in order to prevent the candy from adhering to them.

This is a great advantage, for with the metal or stone moulds hitherto used, the candy will adhere more or less to them, and occasion a great deal of delay and difficulty.

In moulding pop-corn candy, the sirup or sugar, after being cooked, is placed into a tub or receiver, and the pop-corn placed therein, and the sirup or sugar and corn well stirred and mixed together. It is then ready for the moulds.

In case a large quantity of candy is moulded at once, so that the first portion will get cold before the last portion is moulded, the sticks, as they are taken from the moulds, may be placed in an oven or any warm place, in order to keep them in a sufficiently-soft state for compressing, which is the last operation, and which is done by means of a press composed of an upright frame, J, having fitted within it two horizontal bars, K K', placed one above the other, with their ends working in guides, $e\ e$.

The upper bar, K, has two vertical rods, $d\ d$, attached to it, one near each end, and these rods extend down and pass loosely through the lower bar, K', and have each a spiral spring, $e$, upon them, between the bars, said springs having a tendency to keep the bars distended or forced apart.

To the under side of the upper bar, K, there is attached a plunger, L, corrugated or fluted transversely at its under or face side, and to the upper surface of the lower bar, K', there is attached an oblong box, M, having open ends, in which a slide, N, is fitted, one side of said slide having holes made in it to receive a spring-stop, O, attached to one side of the box M.

The upper surface of the slide is fluted or corrugated transversely.

In the lower part of the frame J there is placed a treadle, P, the rear part of which has a rod, Q, connected to it, said rod Q extending upward and bearing against the under side of the lower bar, K'.

The lower ends of the vertical rods $d\ d$ are connected by chains, R R, to the treadle P.

The moulded sticks of candy are placed, one at a time, on the slide N in the box M, and the treadle P pressed down, which causes the stick to be compressed between L and N, the slide N being shoved along after each compression until the above surface of the stick has been acted upon, the slide being held or retained in place during each compression by the spring-stop O.

I claim as new, and desire to secure by Letters Patent—

1. The movable moulds B, constructed each of a bottom-piece, $a$, and a vertical side-strip, $b$, sharpened at its upper edge, in combination with the roller G and the mould's receptacle A, all of which may be constructed of wood or any other material, and arranged substantially in the manner as and for the purpose set forth.

2. The press, composed of the bars K K', arranged and operated substantially as shown, in combination with the plunger or follower L, box M, the slide N and spring-stop O, all arranged for joint operation, substantially in the manner as and for the purpose specified.

E. K. POWERS.

Witnesses:
H. P. BARSTOW,
TH. D. WALDROM.